United States Patent

[11] 3,547,456

[72] Inventor Dawson N. Sapp
Rte. 3, Box 5, Dover, Del. 19901
[21] Appl. No. 791,949
[22] Filed Jan. 17, 1969
[45] Patented Dec. 15, 1970

[54] GAME TRANSPORTING DEVICE
10 Claims, 3 Drawing Figs.

[52] U.S. Cl. ..................................................... 280/19
[51] Int. Cl. ..................................................... B62b 11/00
[50] Field of Search ......................................... 280/19, 18, 12, 11.37(A); 150/52

[56] References Cited
UNITED STATES PATENTS
1,091,402  3/1914  Stout ............................ 280/19
2,667,353  1/1954  Lanice .......................... 150/52
3,222,080  12/1965 Kinraide ....................... 280/18

FOREIGN PATENTS
255,007  3/1926  Great Britain ............... (280/1.5)

Primary Examiner—Banjamin Hersh
Assistant Examiner—Robert R. Song
Attorney—Mason, Fenwick & Lawrence ABSTRACT: A game-transporting device including a flexible enclosure adapted to hold an animal to be transported, the enclosure having a closable elongated opening for inserting the animal to be transported therein, the enclosure consisting of a durable material having a smooth outer surface and manual towing means secured to the enclosure means for dragging the enclosure means containing the animal, along the ground.

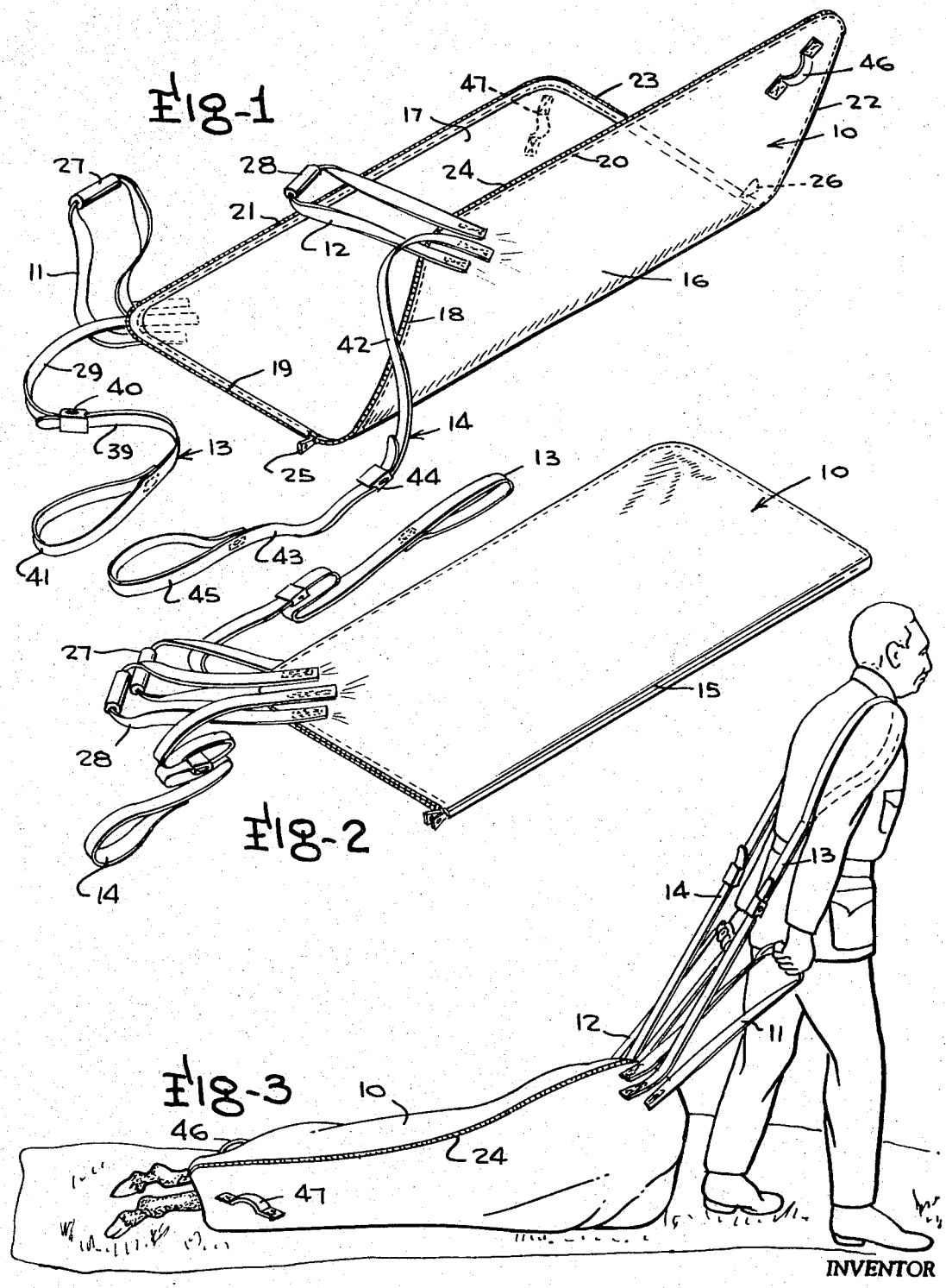

GAME TRANSPORTING DEVICE

This invention relates to a transporting device and more particularly to a device for transporting game which has been slain.

In hunting wild game such as deer and the like, the game normally is slain in remote areas of rugged terrain. Usually, the site where the animal is slain is remote from the hunter's means of transportation, which necessitates transporting the slain animal a considerable distance through rugged terrain to reach the hunter's means of transportation.

It has been found, that transporting game which has been slain through a hunting area, presents a number of formidable problems. Principally, the size, weight and shape of the slain animal presents the most difficult problem in transporting the animal. An animal such as a slain deer often might weigh hundreds of pounds and presents a considerable difficulty for one or even two men to transport over a great distance and particularly through rugged terrain. In the past, it has been the common practice to drag the slain animal out of the hunting area. Such practice depending on the number of men dragging the animal and the physical condition of the men, might become a physical impossibility and further could result in physical injury to those dragging the animal.

It further has been common practice to drag the animal out of the hunting area with the animal fully exposed. This practice has been found to be highly undesirable, in that it causes damage to the head of the deer, which the hunter may want to preserve for mounting, and also to the hide which the hunter may want to preserve for tanning. The greatest hazard, however, in transporting a slain animal out of a hunting area fully exposed, is the possibility of being fired upon by other hunters. It is not uncommon for hunters to fire indiscriminately at the first glimpse of an animal, which often results in firing at a slain animal which is being transported out of a hunting area. Such indiscriminate firing often has resulted in the shooting of hunters transporting slain animals.

It thus has been found to be highly desirable to provide a device for transporting slain animals out of a hunting area, which will facilitate the removal of the animal in an intact and undamaged condition, and which will eliminate the hazard of being fired upon by other hunters while transporting a slain animal through hunting area.

Accordingly, the principal object of the present invention is to provide a transporting device.

Another object of the present invention is to provide a novel game-transporting device.

A further object of the present invention is to provide a novel device for transporting a slain animal through a hunting area.

Another object of the present invention is to provide an improved device for transporting a slain animal through a hunting area having a rugged terrain.

A further object of the present invention is to provide a novel device for transporting a slain animal through a hunting area, which requires minimum physical effort.

A still further object of the present invention is to provide an improved device for transporting a slain animal through a hunting area, which greatly diminishes the probability of being fired upon by other hunters in the area.

A still further object of the present invention is to provide a novel device for transporting a slain animal through a hunting area having a rugged terrain, wherein damage to the head and hide of the animal is prevented.

Another object of the present invention is to provide a novel device for transporting an animal, which is collapsible to a compact size for carrying when not in use.

A further object of the present invention is to provide a game-transporting device which is simple in construction, comparatively inexpensive to manufacture, and effective in performance.

Other objects and advantages of the present invention will become more apparent to those persons having ordinary skill in the art to which the present invention pertains, from the following description taken in conjunction with the accompanying drawing, wherein:

FIG. 1 is a perspective view of an embodiment of the invention in the open position;

FIG. 2 is a perspective view of the embodiment illustrated in FIG. 1, shown in the closed position; and FIG. 3 is a perspective view of the embodiment illustrated in FIGS. 1 and 2, illustrating the use of the embodiment.

Briefly described, the present invention relates to a game-transporting device generally including a flexible enclosure comprising a panel folded to provide a pair of overlying panel sections having coextensive edges, interlocking elements provided along the coextensive panel section edges, and slide fasteners provided at opposite ends thereof. The enclosure consists of a durable material having a smooth outer surface, and is provided with manual towing means consisting of a pair of hand straps and a pair of shoulder straps secured to the overlying panel sections, for dragging the enclosure over the ground.

Referring to the drawing, there is illustrated an embodiment of the invention. The embodiment generally includes a substantially rectangular panel 10, a pair of hand straps 11 and 12, and a pair of shoulder straps 13 and 14. The panel 10 consists of a durable material having a smooth surface, such as nylon, and is adapted to be folded about a center fold line 15 to provide a pair of overlying panel sections 16 and 17 having transverse coextensive front edges 18 and 19, longitudinal coextensive side edges 20 and 21, and transverse coextensive rear edges 22 and 23. The panel edges are provided with interlocking elements 24 which may be secured together along the coextensive edges of the overlying panel sections 16 and 17, to provide an enclosure for a slain animal. The interlocking elements 24 are provided with slide fasteners 25 and 26 which permit the enclosure to be opened or closed at the opposite ends thereof.

The hand straps 11 and 12 are formed from a material having high strength properties, such as nylon, and are secured to the front ends of the panel sections 16 and 17. The hand straps further are provided with tubular handles 27 and 28 which facilitate grasping the hand straps when the enclosure is being dragged, as illustrated in FIG. 3. The shoulder strap 13 includes a lower section 29 fastened to an upper section 30 by means of a clamp 40. The strap section 29 is secured to the panel section 17 adjacent the secured ends of the hand strap 11, and the upper strap section 39 is provided with a loop portion 41 which is adapted to be worn on the shoulder of the user, as illustrated in FIG. 3. Similarly, the shoulder strap 14 includes a lower section 42 fastened to an upper section 43 by means of a clamp 44. The lower end of the strap section 42 is secured to the panel section 16 adjacent the ends of the hand strap 12, and the free end of the strap section 43 is provided with a loop portion 45 which is adapted to be worn on the opposite shoulder of the user. The shoulder straps 13 and 14 also are formed from a material having high strength properties, such as nylon.

The rear ends of the panel sections 16 and 17 further are provided with hand straps 46 and 47, which are made of a material similar to the panel sections 16 and 17. The hand straps 11 and 12, shoulder straps 13 and 14, and hand straps 46 and 47 preferably are securely stitched to the panel sections 16 and 17.

In the use of the embodiment as illustrated in FIGS. 1 through 3, in transporting a slain animal through a hunting area having rugged terrain, the enclosure consisting of the panel sections 16 and 17 is opened and laid on the ground adjacent the slain animal. The animal is then lifted and placed on the open panel sections 16 and 17. The panel sections are then folded over the animal and the ends of the panel sections are fastened together with the slide fasteners 25 and 26. In the event the animal is too large for the enclosure, the front or rear end of the enclosure is left open to permit a portion of the animal to project out of the enclosure. With the animal positioned within the enclosure, the user places the shoulder straps 13 and 14 on his shoulders and grasps the hand straps 11 and 12 by the handles 27 and 28, as illustrated in FIG. 3. In the event the shoulder straps 13 and 14 are not of proper or comfortable length, their lengths may be adjusted by means of the adjusting clamps 40 and 44. Under such conditions, the hunter is in a position to drag the slain animal in the enclosure with minimum effort. As illustrated in FIG. 3, the embodiment permits the user to use his shoulders and arms to drag the slain animal. If another hunter is available, he may assist in transporting the slain animal by the use of the hand straps 46 and 47, provided at the rear end of the enclosure.

The enclosure of the slain animal and the durable smooth surface of the panel 10 forming the enclosure facilitates the dragging of the slain animal and prevents any part of the animal from snagging on the terrain as it is being dragged. It is preferred that the entire embodiment be of a bright orange color, so that it would be easily visible to other hunters in the area. It will be appreciated that the entire or substantial enclosing of the slain animal and the bright orange color of the panel 10 forming the enclosure, will greatly diminish, if not eliminate, the hazard of other hunters in the area firing in the direction of the hunter attempting to transport the slain animal out of the hunting area.

When the embodiment is not in use in transporting a slain animal, it may be folded into a compact size which easily may be carried by the hunter. It further is contemplated that the embodiment when not in use for transporting an animal, may be utilized for other purposes, such as a body protector or a ground cover to sit on.

I claim:

1. A game-transporting device comprising a flexible enclosure adapted to receive an animal to be transported, said enclosure having an elongated opening about a portion of a periphery thereof, means for adjusting the size of said opening to permit insertion of said animal and to accommodate projecting portions thereof, said enclosure consisting of a durable material having a smooth outer surface capable of withstanding snagging when the enclosure is dragged over uneven terrain, and a pair of manual towing means secured to said enclosure means at one end thereof and each on opposite side of said means for adjusting the size of said elongated opening for dragging said enclosure means containing said animal along the ground.

2. A game-transporting device according to claim 1, wherein said manual towing means comprise a pair of hand straps.

3. A game-transporting device according to claim 1, wherein said manual towing means comprise a pair of shoulder straps.

4. A game-transporting device according to claim 1, wherein said manual towing means comprise a pair of hand straps and a pair of shoulder straps.

5. A game transporting device according to claim 1, wherein said flexible enclosure comprises a panel folded to provide a pair of overlying panel sections having coextensive edges defining said opening, and said adjusting means comprising interlocking elements provided along said coextensive panel section edges, and a pair of slide fasteners operatively connected to said interlocking elements.

6. A game-transporting device according to claim 5, wherein said manual towing means comprise a pair of hand straps.

7. A game-transporting device according to claim 5, wherein said manual towing means comprise a pair of shoulder straps.

8. A game-transporting device according to claim 7, wherein the lengths of said shoulder straps are adjustable.

9. A game-transporting device according to claim 5, wherein said manual towing means comprise a pair of hand straps and a pair of shoulder straps.

10. A game-transporting device according to claim 9, wherein said hand and shoulder straps are secured to one end of said overlying panel sections, and including a third pair of straps secured to the opposite end of said overlying panel sections for lifting said opposite end.